May 17, 1955
H. S. WINNICKI ET AL
2,708,619
ALKALI PHOSPHATE PRODUCTION
Filed Feb. 27, 1951
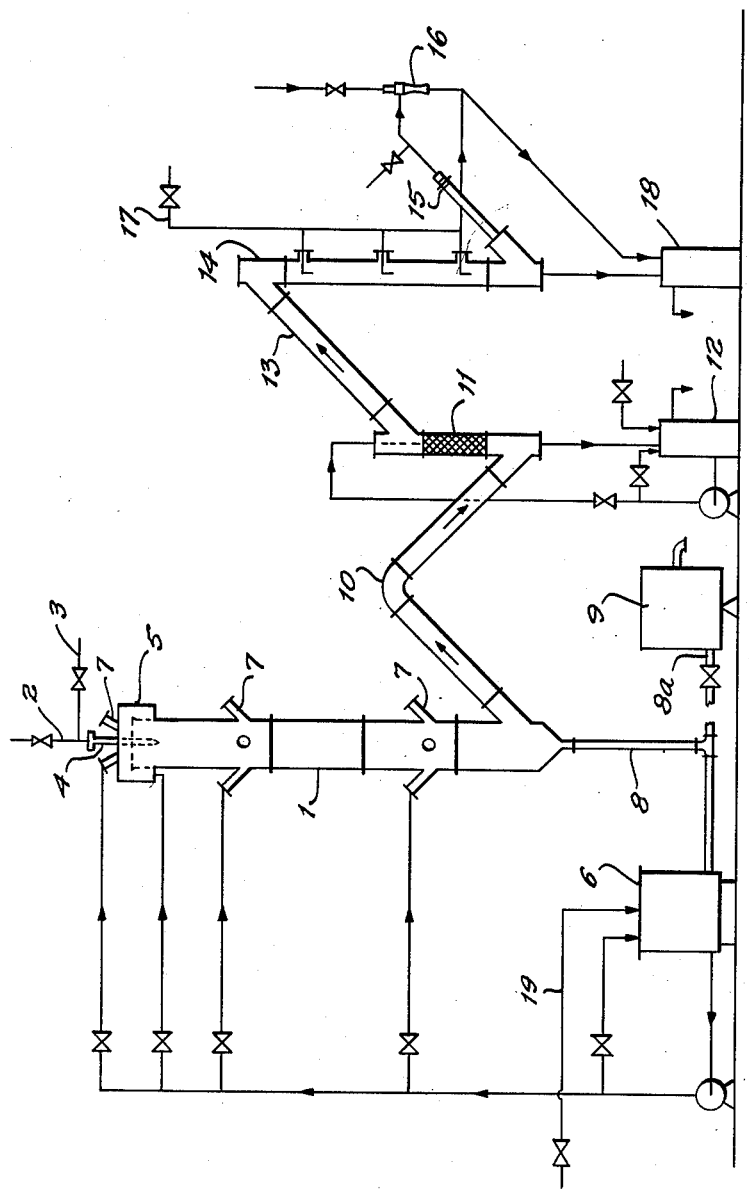
INVENTORS
HENRY S. WINNICKI
CHARLES P. ROBERTS
BY
Pollard E Johnston
ATTORNEY

United States Patent Office 2,708,619
Patented May 17, 1955

2,708,619

ALKALI PHOSPHATE PRODUCTION

Henry S. Winnicki, White Plains, N. Y., and Charles P. Roberts, Pocatello, Idaho, assignors to Food Machinery and Chemical Corporation, New York, N. Y., a corporation of Delaware Application February 27, 1951, Serial No. 212,923

9 Claims. (Cl. 23—107)

This invention relates to the production of alkali metal phosphates such as for example sodium, potassium and ammonium phosphates.

In the usual process for the manufacture of alkali metal phosphates using elemental phosphorus and an alkali metal carbonate or hydroxide as the primary raw materials, the phosphorus is burned in a tower to form phosphorus pentoxide and the phosphorus pentoxide is absorbed in water usually in a separate hydrator to produce phosphoric acid. An electrostatic precipitator is normally used to precipitate the last traces of phosphoric acid from the exit gases. The phosphoric acid is collected and then reacted with an alkali metal carbonate or hydroxide to form the alkali metal phosphate in solution which may thereafter be dehydrated to obtain the desired phosphate in solid form.

In burning the phosphorus to form phosphorus pentoxide, a large amount of heat is generated and additional heat is generated when the phosphorus pentoxide reacts with water to form phosphoric acid and also when the alkali metal carbonate or hydroxide is mixed with the phosphoric acid. Heat must be supplied, however, to remove the water in the production of the alkali metal phosphate in dry form.

In the absorption of the hot phosphorus pentoxide gas in water to produce phosphoric acid, one of the principal problems encountered is that of providing equipment which is resistant to the corrosive action of the acid at the high temperatures prevailing. The vapor pressure of water from 75% phosphoric acid is relatively low so that in the absorption of phosphorus pentoxide in water or recirculated phosphoric acid at or near atmospheric pressure, the temperature of the solution remains above that at which ordinary or stainless steel will resist corrosion by phosphoric acid. Cooling of the phosphorus pentoxide vapors before absorption or of the recycled acid solution in heat exchangers located outside of the absorber chambers adds to the expense of the process. The process such as outlined above is described in greater detail in "Chemical Engineering," vol. 55, No. 10, page 105, October 1948.

It is the object of the present invention to provide an economical process for the production of alkali metal phosphates in which phosphorus pentoxide vapors are directly absorbed in and reacted with an aqueous alkali metal carbonate or hydroxide solution to produce the desired alkali metal phosphate which may be later crystallized and sometimes molecularly dehydrated to produce the final product.

A further object of this invention is to provide a process for the production of alkali metal phosphates in which phosphorus pentoxide is absorbed and reacted in an aqueous alkali metal carbonate or hydroxide solution flowing along the walls of the tower or vessel in which the phosphorus is burned to phosphorus pentoxide and in which all cooling of the alkali phosphate solution takes place in said tower.

Another object is to evaporate part of the water in the tower to produce a more nearly saturated solution of the alkali phosphate and reduce the amount of water which must later be evaporated from the alkali phosphate solution to produce crystallized phosphates.

Another object of the invention is to eliminate the necessity for the use of electrostatic precipitators to remove the last traces of phosphoric acid from the exit gases from the process.

Various other objects and advantages of our invention will appear as this description proceeds.

Preferably the conditions are such that by the evaporation of water from said solution flowing along the walls of the phosphorus burning tower the temperature of the solution is kept below 100° C. and the walls of the tower are hence kept below the temperature at which serious corrosion of steel or stainless steel is encountered.

If necessary the alkali metal phosphate solution produced by direct reaction of phosphorus pentoxide with aqueous alkali metal solution may be adjusted to the proper alkali to phosphate ratio, for example by adding further alkali carbonate or hydroxide thereto, before crystallizing and dehydration to produce the desired alkali metal phosphate.

Preferably the absorption of the phosphorus pentoxide in the alkali metal solution takes place in the tower in which phosphorus is burned to phosphorus pentoxide, but the absorption and reaction of the phosphorus pentoxide in the alkali solution may take place at any desired point in the process, as for example in a separate contact chamber or scrubber. All cooling of the absorbing liquid preferably takes place in the phosphorus burning tower or the hydrator in which the phosphorus pentoxide vapors are contacted with the alkali metal solution so that outside coolers or heat exchangers are not needed.

The accompanying drawings illustrate in diagrammatic form a preferred embodiment of the apparatus for the practice of our invention.

In the apparatus illustrated there is a tower 1 in which elemental phosphorus from the line 2 may be atomized with air from the line 3 in a nozzle 4 and burned with additional air admitted to the top of the tower 1 to produce phosphorus pentoxide. Preferably additional air inlet openings of restricted area (not shown) are provided in the cap 5 around the nozzle 4 and a slight excess of air is used. A phosphorus burner of this general type is described in greater detail in said "Chemical Engineering," vol. 55, No. 10, page 105, October 1948.

Surrounding the top open end of the tower 1 is a cap 5 forming a reservoir into which an aqueous alkali metal solution such as a solution of sodium or potassium or ammonium carbonate or hydroxide or a solution of trona may be pumped from a suitable solution tank 6. The alkali metal solution preferably overflows suitable weirs indicated in dotted lines around the top of the tower 1 and is pumped in sufficient volume to insure that it flows down and covers the walls of the tower 1 from top to bottom thereof. If desired additional spray inlets 7 for the alkali metal solution may be provided in the top of cap 5 and at spaced intervals along the tower as indicated so that additional alkali metal solution may be introduced in the form of sprays at these points. The inlets 7 in the walls of the tower 1 may be located at 90° spacing around the tower or in any other arrangement which will provide uniform distribution of an adequate amount of the alkali metal solution in the tower. If desired water may be sprayed into the tower 1 through some of the inlets 7. One or more towers 1 may be used and each tower may have one or more phosphorus burner nozzles 4 mounted therein.

The phosphorus pentoxide produced by the burning of the phosphorus in the top of the tower 1 is absorbed in and reacts with the aqueous alkali metal solution flowing through the tower to produce the alkali metal phosphate which is recirculated through the tower until it has absorbed the amount of phosphorus pentoxide desired. Due to the heat of the phosphorus combustion as well as the heat of the reaction between the alkali metal solution and the phosphorus pentoxide, water is evaporated from the solution flowing through and along the walls of the tower and prevents the temperature of the solution from rising. The evaporation of this water maintains the temperature of the solution along the walls of the tower at a lower level than is possible when the phosphorus pentoxide is absorbed and reacted in water to produce phosphoric acid of commercial grade. The presence of the water vapor in the tower in the instant process assists in the absorption and reaction of the phosphorus pentoxide vapors with the alkali metal solution thus promoting better recovery or absorption of these vapors within the tower.

For example, when phosphorus is burned with 30% excess air and an aqueous solution of sodium carbonate is circulated through the tower 1, the partial pressure of the water vapor in the gas stream is about 0.72 atmosphere or about 550 mm. This corresponds to a temperature of the circulating alkali solution in the tower of approximately 97° C. the circulating solution being one derived from a solution containing about 30% $Na_2CO_3$, corresponding to a saturated solution of sodium carbonate in water at 30° C. With a more dilute solution the temperature would be lower. Under prior art practices using water to form the acid, a 75% phosphoric acid solution circulated through the tower 1 would produce a temperature in the range of 110 to 120° C. Phosphoric acid at this temperature is very corrosive.

Certain types of stainless steels, such as AISI type 316 stainless steel, have adequate corrosion resistance to alkali phosphate solutions at temperatures up to 100° C. or higher, but such materials of construction are not corrosion resistant to 75% phosphoric acid at temperatures above 80° C.

From the tower 1 the alkali phopshate solution flows through a conduit 8 in part back to the solution tank 6 for recycling and in part through the branch conduit 8a to a suitable crystallizing or other dehydrating or heat treating apparatus 9 for dehydration or heat treatment to produce the alkali phosphate in solid form. The phosphate in solid form may be subjected to further heat treatment to produce molecularly dehydrated phosphates. If desired a storage reservoir for the alkali metal phosphate solution and an evaporator or crystallizer may be interposed between the conduit 8a and the dehydrating and heat treating apparatus 9.

The gases from tower 1 containing phosphorus pentoxide, water vapor, air and in some instances carbon dioxide, flow through an outlet 10 to a scrubber 11 where they are preferably contacted with a circulating aqueous alkali metal solution from the supply tank 12 to absorb and remove additional phosphorus pentoxide from the gases. The scrubber 11 may be packed with a suitable packing such as fiberglass or a Venturi scrubber may be used to insure intimate contact between the gases and the alkali solution.

The solution from tank 12 may be periodically diverted to the tank 6 for circulation through the tower 1 or to the line 8a for dehydration and conversion into alkali metal phosphates in the furnace 9. Suitable make up solution may then be added to the tanks 6 and 12 as needed.

From the scrubber 11 the gases pass through an outlet 13 to a condenser 14 where the gases are preferably sprayed with water from the line 17 to condense most of the water vapor and cool the residual gases to below 80° C. and thence pass through line 15 to a steam ejector or exhauster 16 which maintains a slight vacuum on the entire system. Condensates and water from the condenser 14 flow to a tank 18 and from there through an overflow to a suitable discharge point. The constant evaporation of water from the alkali metal solution in the tower 1 increases the concentration of the alkali metal phosphate solution and thereby reduces the amount of water to be removed in the dehydrating and heat treating of the alkali metal phosphates produced.

The process has great flexibility and can be used to produce sodium, potassium or ammonium phosphates of various compositions according to the following typical reactions:

1. $P_4 + 5O_2 = 2P_2O_5$
2. $3P_2O_5 + 5Na_2CO_3 + 4H_2O =$
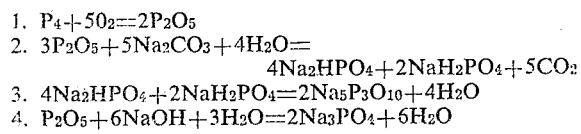
3. $4Na_2HPO_4 + 2NaH_2PO_4 = 2Na_5P_3O_{10} + 4H_2O$
4. $P_2O_5 + 6NaOH + 3H_2O = 2Na_3PO_4 + 6H_2O$ If a solution of trona is used for the alkali, one possible reaction is 5. $10Na_2CO_3.NaHCO_3.2H_2O + 9P_2O_5 =$
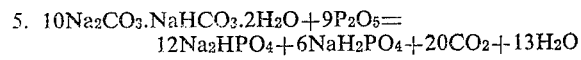

Other trona proportions and reactions may be used.

Under certain circumstances trisodium phosphate may be used as the absorbent solution according to the following reaction:

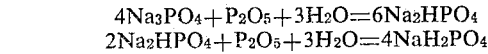

Potassium or ammonium carbonate or hydroxide may be used in place of sodium carbonate or hydroxide.

From the monosodium and/or disodium phosphate produced in the instant process other alkali metal phosphates such as sodium tripolyphosphate and tetrasodium pyrophosphate may be produced by proper heat treatment according to well known procedures.

As a specific example of one way to produce sodium tripolyphosphate, a sodium carbonate solution is circulated through the tower 1, and is recirculated until it has absorbed enough phosphorus pentoxide to be converted into a mixture of disodium phosphate and monosodium phosphate in the ratio of 2 to 1 and then diverted to storage or to the crystallizing and heating means 9 where by suitable heat treatment this mixture is converted into sodium tripolyphosphate. Additional sodium carbonate solution is added to the solution tank 6 as needed from the supply line 19.

The recycled alkali metal solution flowing down the walls of the tower 1 quickly absorbs phosphorus pentoxide and is converted into an alkali phosphate which is recirculated until it has absorbed the desired amount of phosphorus pentoxide after which it may be diverted for storage or for crystallization and dehydration and additional alkali metal solution added to the tank 6 from the line 19.

The advantages of the present process are numerous. By utilizing an aqueous alkali metal solution and regulating its concentration and flow in contact with phosphorus pentoxide gases, the phosphorus pentoxide is absorbed and reacted directly with the aqueous alkali solution, a lower temperature is maintained along the walls of the tower, less corrosion is encountered, cheaper materials of construction may be used, and no outside cooling of the circulating alkali solution is necessary to maintain suitable operating conditions. In an alternative procedure within the broader concepts of our invention, the alkali solution instead of being flowed down the walls of a tower 1 may be reacted with the phosphorus pentoxide gases in a chamber separate from the burner tower, or in a larger scrubber of the same construction as scrubber 11. It is preferable, however, to react the phosphorus pentoxide with the alkali metal solution flowing along the walls of a tower, such as the tower 1, for this mode of operation promotes better reaction and at the same time solves the problem of maintaining the walls of the tower below the temperature at which serious corrosion problems are encountered.

The expression "aqueous alkali metal solution of the group consisting of sodium, potassium and ammonium carbonates and hydroxides" as used in the claims hereof is intended to include normal hydroxides and carbonates of sodium, potassium and ammonium and also sodium bicarbonates, sodium sesquicarbonates and trona.

Various modifications and changes may be made in the process and apparatus described without departing from the spirit of this invention or the scope of the appended claims.

We claim:

1. The method of producing alkali metal phosphates which comprises burning phosphorus in a downwardly directed flame in the top of an elongated, vertical, thin-walled, unlined, stationary, steel reaction chamber which is corrosion resistant to alkali solutions up to 100° C. to produce phosphorus pentoxide, flowing an aqueous alkali solution initially containing a compound selected from the group consisting of sodium, potassium and ammonium carbonates and hydroxides downwardly along the inside walls of said reaction chamber in concurrent flow with said downwardly directed flame, covering the walls of said reaction chamber from top to bottom thereof with said solution, reacting the phosphorus pentoxide with said solution flowing downwardly along the walls of said reaction chamber to produce an alkali phosphate solution, maintaining the walls of said reaction chamber between 80° and 100° C. by evaporating water from said solution within said chamber, removing the solution from said chamber and crystallizing and dehydrating the reaction product to produce a solid alkali phosphate mass.

2. The method of producing alkali metal phosphates which comprises circulating an aqueous alkali solution initially containing an alkali metal carbonate therein downwardly along the inside of an elongated, vertical, thin-walled, unlined, stationary steel reaction chamber, covering the walls of said chamber from top to bottom with said solution, burning phosphorus in a downwardly directed flame in the top of said chamber to produce phosphorus pentoxide, reacting the phosphorus pentoxide with said aqueous alkali metal carbonate solution flowing downwardly along the walls of said chamber to form an alkali phosphate solution, and maintaining the temperature of said solution and the walls of said chamber below 100° C. by evaporating water from said solution inside said chamber, recirculating said solution along the walls of said chamber from the top to the bottom thereof, withdrawing a portion of said solution from the recirculation and dehydrating said solution, and withdrawing gases and water vapor from the bottom of said reaction chamber under vacuum.

3. The method of producing alkali phosphates which comprises burning phosphorus in a downwardly directed flame in the top of an elongated, vertical, unlined, stationary metal tower which is corrosion resistant to alkali phosphate solutions up to 100° C. to produce phosphorus pentoxide, flowing an aqueous alkali solution initially containing a compound of the group consisting of sodium, potassium and ammonium carbonates and hydroxides downwardly along the walls of said tower in concurrent direction with said burning phosphorus to absorb phosphorus pentoxide and form an alkali phosphate, and cooling the walls of said chamber to below 100° C. by evaporating water from said solution inside said tower, maintaining a film of said solution on the walls of said tower from the top to the bottom thereof, removing the alkali phosphate solution from said tower, and dehydrating the alkali phosphate to produce a solid alkali phosphate mass.

4. The method of producing alkali phosphates which comprises flowing an aqueous alkali solution initially containing a compound selected from the group consisting of sodium, potassium and ammonium carbonates and hydroxides downwardly along the walls of an elongated, vertical, unlined, stationary metal tower which is corrosion resistant to alkali phosphate solutions up to 100° C., covering the walls of said tower from top to bottom thereof with said solution, burning phosphorus in a downwardly directed flame in the top of said tower to produce phosphorus pentoxide, and flowing the burning phosphorus and said aqueous alkali solution in concurrent direction down said tower, absorbing phosphorus pentoxide in said solution to form an alkali phosphate therewith, spraying additional aqueous alkali solution initially containing a compound selected from the group consisting of sodium potassium and ammonium carbonates and hydroxides into said tower, concentrating said solution and maintaining the walls of the tower below 100° C. by evaporating water from said solution inside said tower, separating the gases and water vapor from the alkali phosphate in the base of said tower under vacuum, and recovering the alkali phosphate solution from the base of said tower, separating and dehydrating a portion of the alkali phosphate solution to produce a solid alkali phosphate mass, adding additional aqueous alkali solution of a compound selected from the group consisting of sodium, potassium and ammonium carbonates and hydroxides to said remaining alkali phosphate solution, and recirculating said alkali phosphate solution through said tower.

5. The method of producing alkali phosphates which comprises burning phosphorus in a downwardly directed flame in the top portion of an elongated, thin-walled, unlined, vertical, stationary metal tower which is corrosion resistant to alkali phosphate solutions up to 100° C. to produce phosphorus pentoxide, flowing an aqueous alkali solution initially containing sodium carbonate downwardly along the walls of the tower concurrent to the direction of flow of said burning phosphorus to absorb said phosphorus pentoxide and form alkali phosphate therewith, maintaining a film of said flowing solution along the entire inside walls of said tower from top to bottom thereof, concentrating said solution and cooling and maintaining the temperature of the solution and of the tower below 100° C. by evaporating water from said solution inside said tower, removing the sodium phosphate solution from said tower and crystallizing the sodium phosphate solution, and dehydrating the sodium phosphate to produce a solid sodium phosphate mass.

6. The method of producing alkali metal phosphates which comprises flowing an aqueous alkali solution initially containing a compound selected from the group consisting of sodium, potassium and ammonium carbonates and hydroxides down the walls of an elongated, thin-walled, unlined, vertical, stationary steel tower which is corrosion resistant to alkali phosphate solutions up to 100° C., covering the inside walls of said tower from top to bottom thereof with said solution, burning phosphorus in a downwardly directed flame in said tower to produce phosphorus pentoxide, and flowing said burning phosphorus downwardly in said tower in concurrent direction with the flow of said aqueous alkali solution, absorbing and reacting phosphorus pentoxide in said solution flowing along the walls of said tower to form an alkali metal phosphate therein, concentrating said solution and maintaining the walls of said tower below the temperature at which substantial corrosion takes place by evaporating water from said solution inside said tower, removing the water vapor and gases from said tower, removing the alkali metal phosphate solution from the base of said tower, and dehydrating the alkali metal phosphate to produce solid alkali metal phosphates, contacting the gases removed from said tower with additional aqueous alkali solution outside said tower to absorb more phosphorus pentoxide therefrom, condensing the water vapor from said gases and maintaining a slight vacuum in said tower and condensing system to promote the flow of gases and water vapor therethrough.

7. The method of producing alkali metal phosphates which comprises flowing an aqueous alkali solution initially containing an alkali metal compound of the group consisting of sodium, potassium and ammonium carbonates and hydroxides downwardly along the walls of an elongated, vertical, thin-walled, unlined, stationary, stainless steel tower which is corrosion resistant to alkali phosphate solutions up to 100° C., maintaining a film of said solution along substantially the entire inside walls of said tower from top to bottom thereof, burning phosphorus in one end of said tower to produce phosphorus pentoxide, maintaining the other end of said tower under a slight vacuum to cause said burning phosphorus and phosphorus pentoxide to flow in an elongated stream inside said film and in concurrent direction therewith, absorbing said phosphorus pentoxide in said flowing film to form an alkali metal phosphate therein, cooling said solution and the walls of said tower and maintaining the walls of said tower below 100° C. by evaporating water from said flowing film inside said tower, recirculating said solution through said tower, separating a portion of the alkali metal phosphate solution formed in said tower from the recirculating solution and dehydrating said separated portion to produce alkali metal phosphates in solid form.

8. The method of producing alkali phosphates which comprises flowing an aqueous alkali solution initially containing a compound selected from the group consisting of sodium, potassium and ammonium carbonates and hydroxides down the walls of an elongated, vertical, unlined, stationary steel tower which is corrosion resistant to alkali phosphate solutions up to 100° C., burning phosphorus to produce phosphorus pentoxide in said tower, maintaining a flowing film of said solution flowing downward along the inside walls of said tower from top to bottom thereof, flowing said burning phosphorus in concurrent direction with the flowing film of said solution, absorbing phosphorus pentoxide in said film and forming an alkali metal phosphate therein, evaporating water from said solution within the tower, recirculating said solution through the tower until it is converted into a mixture of monoalkali and dialkali phosphate, withdrawing a portion of this mixture from the circulation and dehydrating the mixture to produce a solid alkali phosphate mass.

9. The method of producing alkali phosphates which comprises surrounding a downwardly directed flame of phosphorus burning in air with a downwardly flowing substantially unbroken hollow film of an aqueous alkali solution initially containing a compound selected from the group consisting of sodium, potassium and ammonium carbonates and hydroxides, absorbing and reacting the phosphorus pentoxide formed by the burning of said phosphorus in said flowing aqueous film and forming alkali metal phosphate therein, and maintaining the temperature of said film below 100° C. by evaporating water from said film, removing said solution from around said flame and evaporating further water therefrom and producing a solid alkali phosphate mass.

References Cited in the file of this patent

UNITED STATES PATENTS

| | | |
|---|---|---|
| 1,439,054 | Armstrong | Dec. 19, 1922 |
| 1,593,514 | Suchy | July 20, 1926 |
| 1,659,198 | Griessbach | Feb. 4, 1928 |
| 2,133,904 | Reichold | Oct. 18, 1938 |
| 2,169,589 | Malowan | Aug. 15, 1939 |
| 2,266,328 | McCullough | Dec. 16, 1941 |
| 2,272,414 | McCullough | Feb. 10, 1942 |
| 2,303,318 | Baskerville | Dec. 1, 1942 |
| 2,327,039 | Heath | Aug. 17, 1943 |

OTHER REFERENCES

Chemical Abstracts, vol. 43 (1949), p. 7649e, abstract of report by M. M. Striplin, Jr., in T. V. A. Chem. Eng. Report No. 2 (1948).